Sept. 12, 1944.   C. G. STRANDLUND   2,357,916
POWER LIFT AND DEPTH CONTROL
Filed Dec. 17, 1941
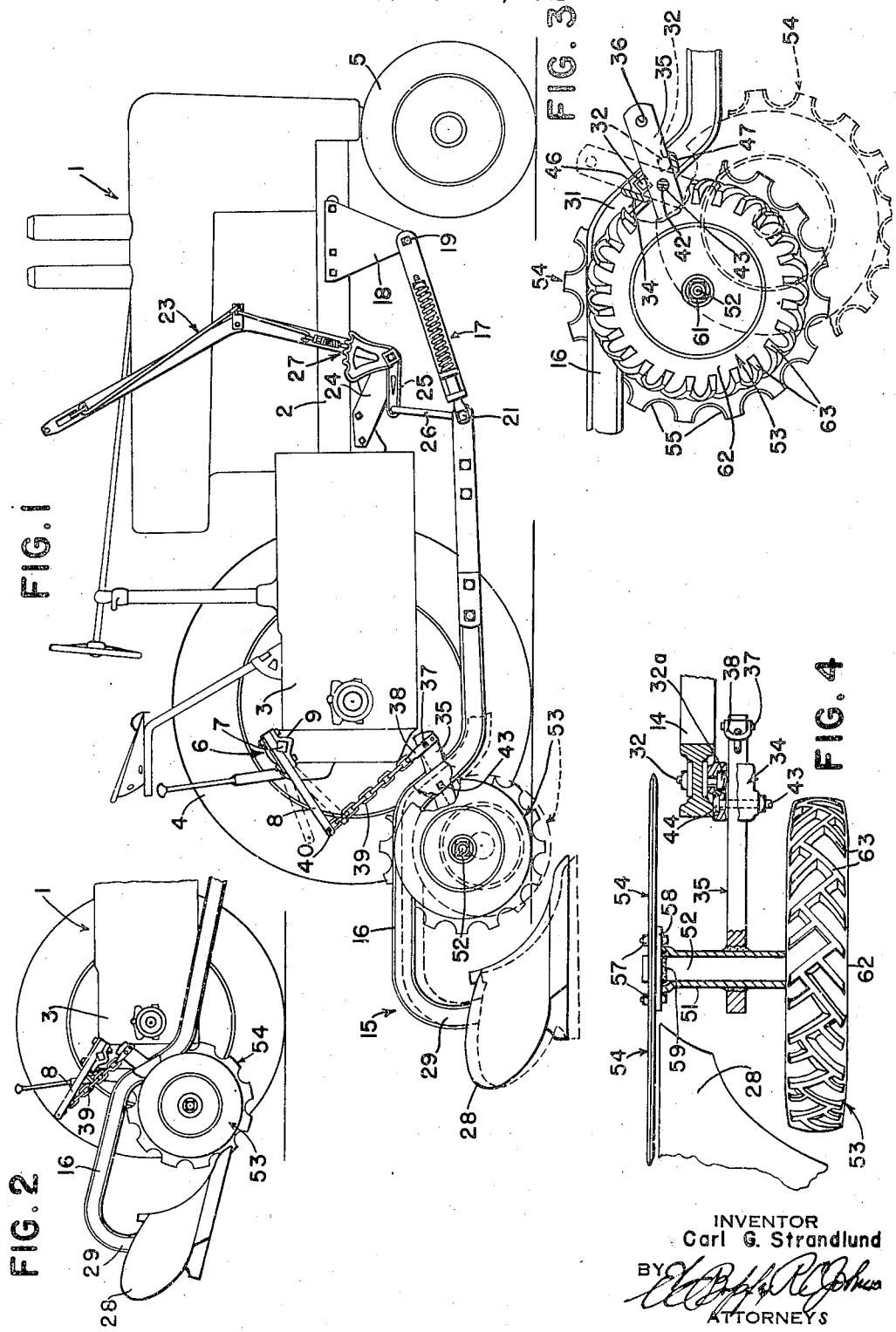
INVENTOR
Carl G. Strandlund
BY
ATTORNEYS Patented Sept. 12, 1944

2,357,916

UNITED STATES PATENT OFFICE 2,357,916

POWER LIFT AND DEPTH CONTROL

Carl G. Strandlund, Moline, Ill., assignor to Deere & Company, Moline, Ill., a corporation of Illinois Application December 17, 1941, Serial No. 423,332

23 Claims. (Cl. 97—50)

The present invention relates generally to agricultural implements and more particularly to ground working implements in which it is desired to maintain a substantially constant depth of operation of the ground working tool means.

The object and general nature of the present invention is the provision of an implement having ground engaging gauge means movably connected therewith and controlled so that if the tool means should start to run too deep, said gauge means is automatically moved downwardly an increased amount, thus tending to bring the tool back to its original operating position. Another feature of this invention is the provision of a plow of the tractor propelled type in which a gauge wheel is mounted on a gauge arm that is pivotally connected with a plow beam and in which a connection extends from the gauge arm to the tractor whereby whenever the plow beam moves downwardly with respect to the tractor, said connection causes said arm to swing and said gauge wheel to move downwardly by an even greater amount. More specifically, it is a feature of this invention to mount a combined gauge wheel and colter assembly on the pivoted arm, connected with the tractor as just described, whereby if either the gauge wheel or the colter should strike an obstruction, they are not required to lift the plow as far as the plow would be lifted if the gauge wheel and colter were connected in fixed relation to the plow beam. A further feature of this invention is the provision of means limiting the permissive swinging movement of the gauge wheel arm relative to the plow beam, whereby the part on the tractor to which the gauge arm is connected may be utilized as a lifting member for lifting both the plow bottom and the gauge wheel into transport position. Still further, another feature of this invention is the provision of a combined gauge wheel and colter mounted on the pivoted arm whereby both the gauge wheel and the colter are both automatically controlled by the connection between the pivoted arm and the tractor.

Another feature of this invention is the provision of an implement, such as a plow, having a tool beam to which an arm is pivoted for limited swinging movement, with a gauge wheel and colter connected in laterally spaced apart relation with the arm a greater distance from the pivot axis of the latter than the point at which the link connecting the arm with the lifting member on the tractor, is connected thereto, the lifting member on the tractor thus serving not only to automatically govern the position of the gauge wheel and colter but also to raise both with the plow when lifting the latter into transport position. When the gauge wheel is spaced a considerable distance from the colter, trash and the like that may collect in front of the colter does not affect the position of the gauge wheel, and where the gauge wheel and colter are connected through a lever whereby they are permitted to move upwardly a considerably greater extent than the corresponding movement of the plow beam, the gauge wheel and colter are not required to lift as much weight. Hence, both the gauge wheel and colter will tend to roll over trash and not be clogged thereby.

These and other objects and advantages of the present invention will be apparent to those skilled in the art after a consideration of the following detailed description, taken in conjunction with the accompanying drawing in which the preferred structure has been illustrated.

In the drawing:

Figure 1 is a side view of a tractor propelled plow in which the principles of the present invention have been incorporated;

Figure 2 is a fragmentary view showing the plow in raised position;

Figure 3 is an enlarged fragmentary view, certain parts being broken away, showing the means for limiting the pivotal action of the gauge wheel supporting arm that is pivoted to the plow beam; and Figure 4 is a view, taken substantially along the line 4—4 of Figure 1, showing the mounting of the gauge wheel and colter on the pivoted arm and certain details of the connection of the gauge wheel pivot member with the plow beam.

Referring now more particularly to the drawing, the tractor which serves as the supporting frame for the plow is indicated in its entirety by the reference numeral 1 and is more or less of conventional construction, embodying frame means 2, the rear axle and transmission housing 3, rear wheels 4, front wheels 5, and a power lift unit indicated in its entirety by the reference numeral 6. The present invention is not concerned with the particular details of the power lift mechanism and hence a detailed disclosure is unnecessary. Briefly, the power lift mechanism includes a suitably controlled rockshaft 7 to which a lifting arm 8 is fixed, as by clamping means 9. If desired, the power lift mechanism 6 may be similar to that shown in the co-pending application filed October 11, 1941, by Wayne H. Worthington, Serial No. 414,631. The power lift mechanism 6 is so constructed that by suitable control means the lifting arm 8 may be moved into any one of a number of different positions of adjustment, as is indicated in dotted lines in Figure 1, or may be swung into a raised position, as shown in Figure 2.

The plow that is shown as connected with the tractor 1, is indicated in its entirety by the reference numeral 15 and comprises a plow beam 16 having its front end extending under the tractor and connected by hitch means 17 with the draft brackets 18 of the tractor 1. Preferably, the hitch 17 is of the spring cushion type and is pivoted at 19 to the brackets 18 and at 21 to the front end of the plow beam 16. The front end of the latter may be raised and lowered by a hand lever 23 which is mounted on a bracket 24 carried by the tractor. The hand lever 23 is of more or less conventional construction and includes an arm 25 that is connected by a link 26 with the front end of the plow. The hand lever 23 is adapted to be secured in any position of adjustment by means of a sector and latch construction 27. By swinging the hand lever 23 forwardly or rearwardly, the front end of the plow bear 16 may be raised or lowered, thereby changing the line of draft and aiding in securing the proper penetration of the plow bottom 28 that is fixed to the rear downturned end 29 of the plow beam 16. The beam 16 and plow bottom 16 constitutes ground working tool means whose depth of operation is controlled by means which will now be described.

The forward portion of the plow beam 16 is connected to the rear portion by a rearwardly and upwardly curved section 31 which is apertured to receive a pair of bolts 32 (Figures 3 and 4) by which a gauge arm pivot casting 34 is adapted to be fixed to the beam 16. The pivot casting 34 is in the nature of a hollow generally triangularly shaped member through which a gauge arm 35 extends. The arm 35 is provided with an opening 36 (Figure 3) in which a pin 37 is disposed. The pin 37 serves to secure a clevis 38 to the end of the arm 35, the clevis 38 being at the lower end of a flexible element in the form of a chain 39, the upper end of which is connected by a pin 40 to the outer end of the tractor lifting arm 8. The gauge arm 35 is also provided with a second aperture 42 in which a pivot bolt 43 is disposed. The pivot bolt 43 passes through suitable openings in the side walls of the pivot casting 34, the latter being formed, as best shown in Figure 4, so that the head 44 of the bolt 43 is substantially flush with that side of the member 34, whereby its attachment to the plow beam 16 is not affected. Likewise, the casting member 34 is so formed that the heads 32a (Figure 4) lie substantially flush with the inner surface of the inner side wall of the member 34 so that they do not interfere with the swinging movement of the gauge arm 35 about the pivot bolt 43 as an axis. The swinging movement of the gauge arm 35 is limited by the end walls 46 and 47 (Figure 3) which serve as stops determining the end positions of the arm 35 relative to the plow beam 16.

The arm 35, as best shown in Figures 1 and 3, is pivoted to the plow beam 16 in such a manner that it extends generally downwardly and rearwardly. The lower and rearward end of the gauge arm 35 is provided with a sleeve 51, preferably welded or otherwise firmly secured to the arm 35. The sleeve 51 serves as a journal support for a shaft 52, to one end of which a gauge wheel 53 is fixed, as best shown in Figure 4. A colter 54 is fixed in any suitable manner to the other end of the shaft 52. Preferably, the colter 54 has a scalloped cutting edge, as indicated at 55, and since the gauge wheel 53 and colter 54 are fixed to the same axle 52, they are thereby constrained for rotation together, with the gauge wheel 53 substantially in front of the central portion of the plow bottom 28 while the colter is spaced laterally inwardly therefrom so as to clear the point of the plow bottom, as best shown in Figure 4. Preferably, the colter 54 is secured by bolts 57 to a plate 58 that is welded, as at 59, to the left end of the shaft 52. The gauge wheel 53 is mounted in any suitable manner on the right end of the shaft 52, the latter preferably being tapered to receive the hub of the gauge wheel 53 whereby the latter may be firmly secured thereto. Also, the right end of the shaft 52 preferably is threaded to receive a nut 61 by which the gauge wheel 53 is secured tightly to the shaft 52. The gauge wheel 53 preferably includes a pneumatic tire 62 which is formed with a non-skid tread 63.

The operation of a plow incorporating the present invention is substantially as follows.

Figure 1 shows the parts in operating position, the plow beam 16 being pivoted at 21 to the hitch 17 and the gauge wheel 53 running along the surface of the ground in advance of the plow bottom 28. If it should be desired to increase or decrease the depth of plowing, the operator actuates the power lift unit 6 so as to swing the arm 8 into an upper or lower position, such as one of those indicated in dotted lines in Figure 1, it thereby raises or lowers the plow bottom 28 relative to the ground surface. During normal operation, the contact of the gauge wheel 53 with the ground acts through the shaft 52 to rotate the colter 54. It will be seen from Figure 1, that the weight of the plow and its section is sustained by two ground engaging means, one being the tractor, whose wheels engage the ground, and the other being the gauge wheel riding along the ground surface. Therefore, there is ample traction between the gauge wheel and the ground to rotate the colter, although the wheel 53 does not press as hard against the ground in the arrangement shown in Figure 1 as would be the case if the gauge wheel 53 were attached rigidly to the plow beam 16. That is to say, the weight of the plow beam and the suction is transmitted to the arm 35 through the bolt 43. The power lift 6 holds the arm 8 in any desired position, and therefore the weight transmitted through the bolt 43 to the arm 35 tends to swing the same in a counter-clockwise direction (Figure 1) about the bolt 37, thus tending to swing the gauge wheel 53 downwardly which is, of course, resisted by its contact with the ground.

Since the colter 54 is driven positively there is less tendency for trash and the like to collect in front of the colter 54, as may sometimes occur when the colter is mounted for free rotation. If either the gauge wheel 53 or the colter 54 should strike an obstruction, such as a rock embedded in or extending above the surface of the ground, it will be forced to swing upwardly. However, due to the fact that the distance from the axle 52 to the pivot bolt 43 is much greater than the distance from the bolt 43 to the pin 37, the resistance against upward movement, due to the weight of the plow and associated parts, is much less, since the colter and gauge wheel may be considered as having a considerable mechanical advantage, than would be the case if the colter and gauge wheel were fixed to a rigid bracket on the plow beam. In other words, an upward displacement of the gauge wheel and colter of, say, three inches, is required to lift the plow beam and associated parts only approximately one inch. This is a particular advantage in the case of the colter, for in prior implements, frequently colters have been broken upon striking a rock, due to the fact that the colters were not strong enough to raise the entire plow the full distance the colter had to raise in order to pass over the obstruction. Since the gauge wheel 53 is a considerable distance laterally from the colter 54, any trash or the like that might possibly accumulate in front of the colter would not have any effect upon the position of the gauge wheel 53, and therefore the function of the latter in gauging the depth of operation of the plow is not interfered with to any material extent.

The operation of the gauge wheel 53 in determining the working depth of the plow bottom is believed to be clear from Figure 1. Assume that the plow tends to run too deep; the resulting downward movement of the bolt 43 carried on the beam 16 acts through the arm 35 to swing the gauge wheel 53 downwardly by an increased amount, the ratio as illustrated being approximately three to one since the distance from the axle 52 to the pin 37 is approximately three times the distance from the bolt 43 to the pin 37. This action is shown in dotted lines in Figure 1, in which the plow 28 is shown as displaced from the full line position to the dotted line position. This movement of the plow beam acts through the arm 35 to cause the gauge wheel 53 to be moved downwardly from its full line position to its dotted line position, a distance that is much greater than the displacement of the plow bottom. This additional displacement of the gauge wheel 53 therefore acts to immediately return the plow bottom 28 to the desired depth of operation. It will be understood, of course, that the displacements indicated in Figure 1 may not actually occur, since the first increment of downward displacement of the plow bottom below its desired operating position acts through the gauge wheel 53 by virtue of the increased displacement of the latter resulting therefrom to practically instantaneously return the plow bottom to its normal position. This action is augmented by the fact that downward displacement of the gauge wheel 53 also causes the same amount of downward displacement of the colter 54. It can also be noted that the gauge wheel 53 will roll over any accumulated trash, rather than push the same forwardly, much more easily since the upward movement of the gauge wheel 53 is required to lift the plow and associated parts only approximately one-third the distance the gauge wheel moves. These ratios may vary, as desired.

The power lift unit 6 may also be operated to raise the lifting arm 8 into a lifted or transport position, as shown in Figure 2. This action is made use of in the present invention for raising both the plow and the colter and gauge wheel, in that the stops 46 and 47 (Figure 3) limit the movement of the arm 35 relative to the plow beam, and therefore when the arm 8 is swung upwardly, it first raises the plow to its most shallow plowing position and then subsequently brings the arm into contact with the stop 46. Thereafter, further raising movement of the lifting arm 8 raises both the plow and the gauge and colter wheels. In first raising the plow to its most shallow plowing position the power unit 6 acts through the arm 35 against both the gauge wheel 53 and the colter 54, since both are in engagement with the ground. The relation of the parts is such that the gauge and colter wheels drop down to a position to protect the point against catching into an obstruction when driving across rough fields and the like with the plow in transport position. The non-skid tread 63 of the gauge wheel 53 materially facilitates driving the colter 54 from the gauge wheel.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A tractor propelled implement adapted to be attached to a tractor having a power actuated lifting member adapted to be moved from transport position to any one of several different operating positions, said implement comprising a tool beam, tool means carried thereby, a member pivoted at an intermediate point on said tool beam, ground engaging gauge means carried by said member adjacent one end thereof, and means connecting the other end with said lifting member, downward movement of said tool beam relative to the tractor when said lifting member is held in one of its operating positions causing said gauge means to be moved downwardly an increased amount.

2. An automatic depth control for agricultural implements, comprising a lifting member adapted to be fixedly held in various operating positions and to be moved into a transport position, ground working tool means movable relative to said lifting member, ground engaging gauge means movably connected with said tool means, a connection between said gauge means and said lifting member whereby movement of said tool means in one direction relative to the lifting member causes said gauge means to be moved relative to said tool means also in said one direction, and stop means limiting the movement of said gauge means relative to said tool means in said one direction whereby movement of said lifting member into its transport position lifts said tool means and said gauge means into their transport position.

3. A plow comprising a beam, a plow bottom fixed to the rear end thereof, an arm pivotally connected with said beam for relatively free movement between limits, a gauge wheel mounted on said arm adjacent one end thereof, and a lifting connection connected with the other end of said arm and acting to shift said arm relative to said beam to one of said limits and thereafter raise both said arm and said beam.

4. An agricultural machine comprising a tractor having a power connection, tool means movably connected with the tractor, means movable with respect to said tool means for gauging the depth of operation thereof, and means deriving power from said power connection for operating said gauging means and acting through the latter for raising both the tool means and gauging means relative to the tractor, said gauging means acting against said operating means for adjusting the operating position of said tool means.

5. An agricultural implement comprising means serving as a supporting frame, tool means movably connected therewith, ground engaging gauge means movably connected with said tool means, a member connected adjacent one end with said frame means and connecting means between said gauge means and the other end portion of said member, said connecting means including motion reversing means whereby a given amount of downward movement of said tool means relative to said frame means acts through said connecting means to cause said gauge means to move downwardly relative to said tool means.

6. The combination with a tractor, of a tool carrying member connected at its forward end with the tractor, a tool at the rear portion of said member, a member swingably connected with said tool carrying member for movement relative thereto about a transverse axis and including a part extending generally rearwardly from said axis and a part extending forwardly therefrom, a gauge wheel journaled on the rearwardly extending part, a power lift mechanism on the tractor and normally held in fixed relation, means connecting the forwardly extending part of said swingable member with said power lift mechanism, whereby a downward movement of the tool carrying member relative to the tractor causes downward movement of the rearwardly extending part of said swingable member relative to said tool, and means for limiting the movement of said swingable member relative to said tool carrying member whereby operation of said power lift mechanism is adapted to act through said swingable member for raising said tool carrying member and the associated tool.

7. A plow adapted to be attached to a supporting frame, comprising a tool beam adapted to be connected for relative movement with the supporting frame and having a plow bottom secured to the rear end thereof, a lever of the first class pivotally connected with said tool beam for swinging movement relative thereto in a generally vertical plane, means limiting the swinging movement of said lever relative to said beam in both directions, a gauge wheel mounted on one end of said lever, and a lifting and depth adjusting connection on said supporting frame connected with the other end of said lever.

8. An agricultural machine comprising means serving as a supporting frame, a tool beam having a plow bottom secured to the rear end thereof, means connecting said beam with said frame for generally vertical movement relative thereto, a lever pivoted on said tool beam and including a portion extending generally fore and aft of the pivot of said lever, a combined gauge and colter wheel assembly journaled for rotation on the rear end of said lever, and a generally vertically extending connection between the forward portion of said lever and said frame means, whereby vertical movement of said beam acts through said connection to swing said lever and change the position of said assembly relative to the plow beam.

9. An agricultural machine comprising means serving as a supporting frame, a tool beam having a plow bottom secured to the rear end thereof, a lever pivoted on said tool beam and extending generally fore and aft, a colter journaled for rotation on the rear end of said lever, and a connection extending from the forward end of said lever, at a point thereon appreciably closer to the pivot thereof than the axis of said colter, to said frame means whereby when said colter strikes an obstruction and rolls over the same the rear end of the plow is lifted only a fraction of the distance that the obstruction raises the colter.

10. An agricultural machine comprising means serving as a supporting frame, a tool beam having a plow bottom secured to the rear end thereof, a lever pivoted on said tool beam and extending generally fore and aft, an axle fixed to the rear end of said lever, a gauge wheel fixed to one end of said axle at one side of the lever and disposed in front of the generally central portion of the plow bottom, a colter fixed to the opposite end of said axle at the other side of said lever, and a connection between said frame means and said lever at a point on the latter appreciably closer to the pivot of said lever than the axis of said axle, whereby when either said gauge wheel or said colter strikes an obstruction and is lifted thereby, the plow bottom and associated parts are raised only a fraction of the amount that gauge wheel or colter is raised.

11. A tractor propelled implement comprising tool means movably connected with the tractor, a part pivoted on the tool means, ground engaging gauge means connected with said part at one side of its pivot axis and controlled by the position of said part, and means connecting said part at the other side of its pivot axis with the tractor whereby, when the tool means moves relative to the tractor and tends to run too deep, said part is shifted to move said gauge means a distance greater than the corresponding movement of said tool means so that said gauge means tends to restore said tool means to the proper depth.

12. The combination of a tractor, a ground working tool movably connected therewith, ground engaging gauge means, means connecting the ground working tool and the tractor whereby a given displacement of the tool relative to the tractor in one direction causes a greater extent of movement of said gauge means relative to the tractor in said one direction, and means for raising said connecting means so as to raise both said tool and said gauge means into a transport position.

13. The combination of a tractor, a ground working tool movably connected with the tractor, an adjustable arm on the tractor, a gauge arm pivotally connected medially with said tool for limited movement relative thereto, a gauge wheel on said arm at one side of its pivotal axis, and means connecting said gauge wheel arm at the other side of its pivot axis with said adjustable arm, whereby a given displacement of the tool relative to the tractor in one direction acts through said connecting means and said arms for causing a movement of said gauge wheel relative to the tool in said one direction.

14. The combination of a tractor, a plow beam movably connected with the tractor and carrying a plow bottom, a gauge arm pivotally connected medially with said plow beam for limited movement relative thereto, a transverse shaft journaled for rotation adjacent one end of said gauge arm, a gauge wheel fixed to one end of said shaft, a rolling colter fixed to the other end of said shaft and spaced laterally from said gauge wheel whereby the latter is not required to run over trash and the like that may collect in front of the colter, and means connecting the other end of said gauge arm with the tractor whereby downward movement of the plow beam relative to the tractor causes an increased downward movement of both said gauge wheel and said colter relative to the tractor.

15. The combination of a tractor, a plow beam movably connected with the tractor and having a plow bottom fixed to the rear end of the plow beam, an arm pivotally connected with said plow beam, a transverse shaft journaled for rotation on said arm, a gauge wheel fixed to one end of said shaft and disposed in front of said plow bottom, a colter fixed to the other end of said shaft, and means on the tractor and connected with said arm and reacting through the latter against both said gauge wheel and colter for adjusting the position of both said gauge wheel and colter relative to the plow bottom.

16. The combination of a tractor, a plow beam movably connected therewith and having a plow bottom secured to the rear end thereof, an arm pivotally connected with said plow beam, a colter connected with said arm at one side of the pivot axis thereof, and a connection between said arm at the other side of said pivot axis and the tractor whereby if said colter encounters an obstruction and moves upwardly, said plow beam is lifted only by a fraction of the amount of upward movement of the colter relative to the tractor.

17. The combination of a tractor, a plow beam movably connected therewith and having a plow bottom secured to the rear end thereof, an arm pivotally connected with said plow beam, a colter connected with said arm at one side of the pivot axis thereof, means connected with said arm at the other side of said pivot axis and with the tractor, whereby if said colter encounters an obstruction and is moved upwardly, said plow beam is moved upwardly thereby only a fraction of the amount of upward movement of the colter relative to the tractor, and gauging means connected with said arm at said one side thereof and acting through the means connecting said arm with the tractor to maintain said plow bottom at a given depth of operation so long as said plow beam remains in a given position relative to the tractor.

18. In a plow, a plow beam, a plow bottom fixed thereto, a transversely disposed shaft, means connecting said shaft with said plow beam, a gauge wheel fixed to said shaft and disposed substantially in front of said plow bottom, and a colter fixed to said shaft in a position spaced laterally from said gauge wheel, the contact of the gauge wheel with the ground serving to rotate said colter substantially independent of any trash that may collect in front of the colter.

19. An agricultural machine comprising a tool beam having a ground working tool carried thereby, depth controlling means comprising a pair of ground engaging means adapted to engage the ground at spaced points, means connecting said two ground engaging means and carrying the weight of said tool and tool beam in operation thereon, and mechanism responsive to relative movement in one direction between said tool and one of said ground engaging means and reacting against the other of said ground engaging means so as to change the depth of operation of said tool.

20. An agricultural machine comprising a tool beam having a ground working tool carried thereby, depth controlling means comprising a pair of ground engaging means adapted to engage the ground at spaced points, means connecting said two ground engaging means and carrying the weight of said tool and tool beam in operation thereon, and mechanism on one of said ground engaging means for raising said connecting means relative thereto so as to change the depth of operation of said tool, said mechanism including a part receiving the reaction of said connecting means and adapted to be fixed in different positions of adjustment, whereby a tendency of the tool to operate too deep acts through said tool beam and said connecting means to exert an additional downward pressure on the other of said ground engaging means so as to resist said tendency of the tool to operate too deep.

21. An agricultural machine comprising a tool beam having a ground working tool carried thereby, a depth controlling means comprising a pair of ground engaging means adapted to engage the ground at spaced points, means connecting said two ground engaging means and carrying the weight of said tool and tool beam in operation thereon, and mechanism on one of said ground engaging means for raising said connecting means relative thereto so as to change the depth of operation of said tool, said mechanism being operable through two ranges, one to adjust the depth of operation of said tool, and stop means limiting the movement of said connecting means in one direction relative to said tool beam, whereby movement of said mechanism through its other range acts through said connecting means to raise said tool and tool beam into a transport position.

22. An agricultural machine comprising a tool beam having a ground working tool carried thereby, supporting frame means for said tool beam, a gauge wheel adapted to engage the land and connected with said tool beam for generally vertical movement relative thereto, means interconnecting said gauge wheel and frame means whereby movement of the tool beam relative to said frame means in a downward direction causes the gauge wheel to move downwardly relative to said tool beam and thereby oppose downward movement of the latter.

23. In an earth working implement, the combination of a support, a tool-carrying membeer connected with said support for generally vertical movement relative thereto, ground engaging gauge means movably connected with said tool-carrying member, and means connecting said gauge means with said support whereby a given displacement of said member relative to said support in one direction causes a displacement of said gauge means relative to said tool-carrying member in the same direction.

CARL G. STRANDLUND.